(12) United States Patent
Scott et al.

(10) Patent No.: US 12,024,980 B2
(45) Date of Patent: Jul. 2, 2024

(54) MECHANICAL CLUTCH FOR DOWNHOLE TOOLS

(71) Applicant: Halliburton Energy Services, Inc., Houston, TX (US)

(72) Inventors: Bruce Edward Scott, McKinney, TX (US); Kevin Robin Passmore, Mckinney, TX (US); Nicholas Robert Wood, Arlington, TX (US); Jon-Howard Elliott Hanson, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/890,140

(22) Filed: Aug. 17, 2022

(65) Prior Publication Data

US 2024/0060393 A1 Feb. 22, 2024

(51) Int. Cl.
*E21B 34/14* (2006.01)
*E21B 41/00* (2006.01)
*F16D 23/00* (2006.01)

(52) U.S. Cl.
CPC ............ *E21B 34/14* (2013.01); *E21B 41/00* (2013.01); *F16D 23/00* (2013.01); *F16D 2500/1025* (2013.01)

(58) Field of Classification Search
CPC ............ F16D 2500/1025; F16D 11/14; F16D 2011/008; F16D 2011/006; F16D 13/40
See application file for complete search history.

(56) References Cited

U.S. PATENT DOCUMENTS 2,901,210 A * 8/1959 Hebard ............... E21B 43/1235
251/129.1
4,191,248 A * 3/1980 Huebsch ............. E21B 34/066
335/267

(Continued)

FOREIGN PATENT DOCUMENTS

CN 111577782 6/2020
EP 2673458 B1 8/2019

(Continued)

OTHER PUBLICATIONS

International Search Report and Written Opinion for International Patent Application No. PCT/US2022/043330 dated May 11, 2023.

(Continued)

*Primary Examiner* — Christopher J Sebesta
*Assistant Examiner* — Yanick A Akaragwe
(74) *Attorney, Agent, or Firm* — Scott Richardson; C. Tumey Law Group PLLC

(57) ABSTRACT

A mechanical clutch allows for transfer of torque downhole that may avoid the need for a hydraulic electrical coil-driven piston. In one or more examples, an anti-rotation guide for a downhole clutch includes a guide track and a follower moveable along the guide track for guiding relative movement between an upper armature and a lower armature. The guide track includes an axially-extending portion terminating in a circumferential loop. The axially extending portion guides the upper armature into axial engagement with the lower armature in response to rotation of the input shaft. The circumferential loop thereafter allows rotation of the upper and lower armatures together in response to further rotation of the input shaft.

20 Claims, 5 Drawing Sheets

(56) References Cited

U.S. PATENT DOCUMENTS

| | | | | |
|---|---|---|---|---|
| 4,471,810 A | * | 9/1984 | Muchow | F16K 39/04 |
| | | | | 251/282 |
| 5,048,606 A | | 9/1991 | Allwin | |
| 5,642,782 A | | 7/1997 | Grimshaw et al. | |
| 5,918,690 A | | 7/1999 | Hailey | |
| 7,802,951 B2 | | 9/2010 | Houck et al. | |
| 9,518,428 B2 | | 12/2016 | Prill et al. | |
| 11,215,015 B1 | | 1/2022 | Guerrero | |
| 2002/0108747 A1 | * | 8/2002 | Dietz | E21B 34/066 |
| | | | | 166/66.4 |
| 2008/0296015 A1 | * | 12/2008 | Hall | E21B 7/06 |
| | | | | 166/382 |
| 2009/0183921 A1 | | 7/2009 | Gurjar et al. | |
| 2011/0186303 A1 | * | 8/2011 | Scott | E21B 34/08 |
| | | | | 166/373 |
| 2012/0199367 A1 | * | 8/2012 | Bouldin | E21B 43/128 |
| | | | | 166/332.8 |
| 2013/0206389 A1 | * | 8/2013 | Vick, Jr. | E21B 34/102 |
| | | | | 166/105 |
| 2014/0151067 A1 | | 6/2014 | Hart | |
| 2015/0316169 A1 | * | 11/2015 | Bohaychuk | E21B 34/02 |
| | | | | 251/58 |
| 2017/0226806 A1 | * | 8/2017 | Nguyen | E21B 7/24 |
| 2018/0171724 A1 | | 6/2018 | Daigle et al. | |
| 2020/0165840 A1 | | 5/2020 | Wong | |
| 2022/0298887 A1 | | 9/2022 | Ackroyd | |

FOREIGN PATENT DOCUMENTS

| | | |
|---|---|---|
| EP | 2165100 B1 | 12/2020 |
| GB | 2456421 A | 7/2009 |
| GB | 2566798 | 3/2019 |
| GB | 2579289 | 6/2020 |
| WO | 2020112080 | 6/2020 |

OTHER PUBLICATIONS

Netherlands Search Report and Written Opinion for NL Patent Application No. 2035230 dated Nov. 23, 2023. Google English Machine Translation with Original Untranslated Version, PDF file. 18 pages.

* cited by examiner

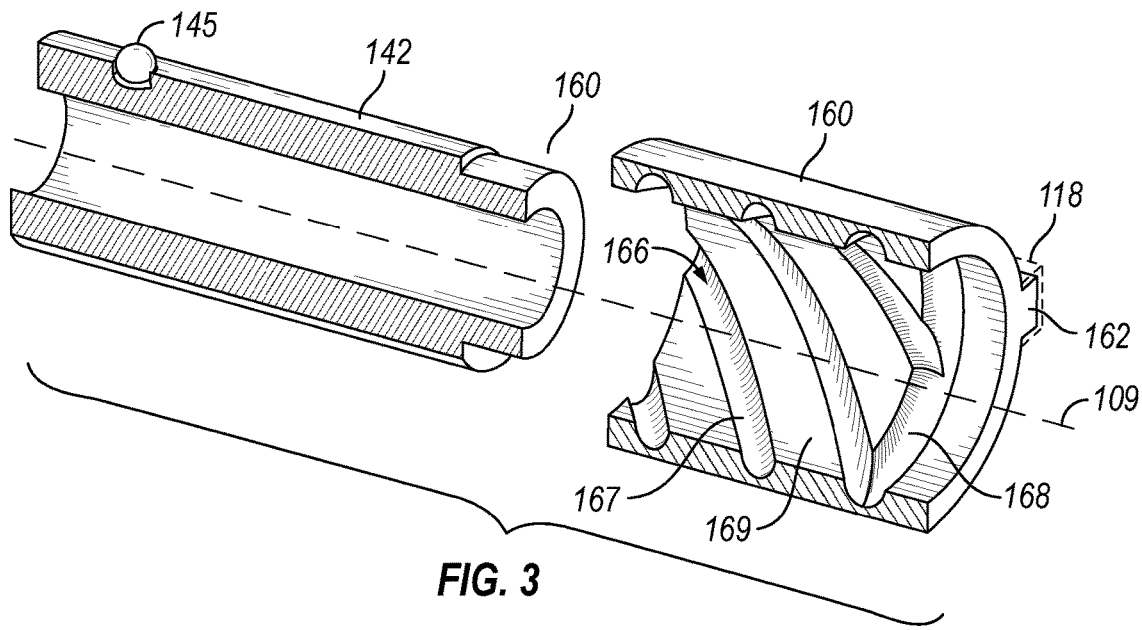
FIG. 3
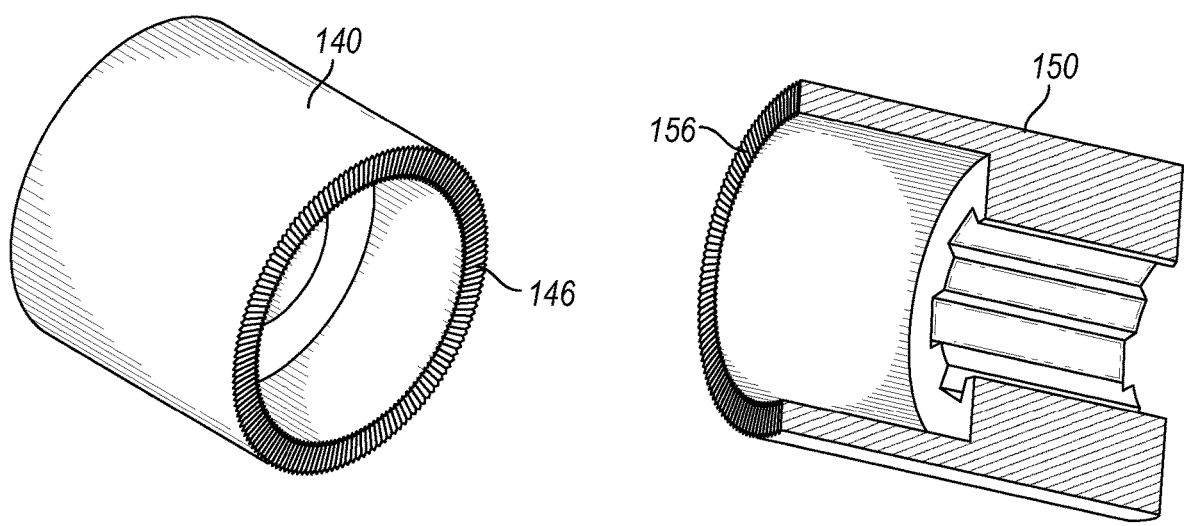
FIG. 4
FIG. 5

MECHANICAL CLUTCH FOR DOWNHOLE TOOLS

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

During production operations, different tools may be disposed downhole on production tubing to control the flow of desirable fluids from a formation. In examples, downhole tools may have valves that actuate using pistons. Currently, these pistons may be hydraulically operated with hydraulic lines that may stretch from the surface to the downhole tool disposed in a formation. There are examples with well installations having on the order of 20 miles of hydraulic control lines. Due to the extreme nature experienced downhole, hydraulic lines may be susceptible to failure and may not operate correctly. Additionally, each line may take up valuable space within a wellbore, which may limit the number of tools an operator may dispose downhole.

More recently, electrical actuators have been investigated and commercialized in part to reduce reliance on hydraulic lines and the attendant complexities. In an example, such a device has a clutch that requires an electro-magnetic coil, thereby requiring electricity to operate. A spring is included to bias the clutch to an open state. In order for the clutch to engage and transmit torque, the electrical coil must be sufficient to overcome the spring force and friction as well as provide enough clamping force to keep the clutch halves engaged. Due to space limitations, such a clutch is limited in the amount of "pull-in" and "clamping" force that can be generated by the electro-magnetic coil. These constraints can limit the effectiveness of the clutch.

BRIEF DESCRIPTION OF THE DRAWINGS

These drawings illustrate certain aspects of some of the embodiments of the present disclosure and should not be used to limit or define the method.

FIG. 3 is a cutaway view of the armature extension juxtaposed with the anti-rotation guide according to the example configuration of FIG. 1.

FIG. 4 is a perspective view of the upper armature according to the example configuration of FIG. 2.

FIG. 5 is a perspective view of the lower armature according to the example configuration of FIG. 2.

DETAILED DESCRIPTION

The present disclosure includes a system and method for transferring torque downhole, such as to operate a subsurface safety valve (SSSV) or other downhole device. An aspect of the disclosure is a clutch wherein an actuation force is provided by a mechanical drive rather than a hydraulic actuator or electromagnetic coil-driven actuator. Rotation of an input shaft is used to bring an upper armature into engagement with a lower armature, to thereby transfer torque and rotation to an output shaft. The rotation may be powered by any type of motor, which may be electrical or fluid-driven. Examples of motor types include brushless DC (BLDC), stepper, servo, or other motor that can provide rotational force. Using rotation of an input shaft to mechanically drive clutch components may avoid the need for a hydraulic actuator and hydraulic lines. The clutch may also be able to generate more clamping force and transmit more torque than an electromechanical (EM) clutch due to its pure mechanical engagement and disengagement.

As an overview, in one or more example configuration, a clutch may include an upper armature with an upper engagement structure designed to transfer torque when axially engaged with a lower engagement structure of a lower armature. An input shaft is rotatably coupled to the upper armature with a mechanical drive there between (e.g., a threaded and/or ball-screw mechanism), whereby relative rotation between the input shaft and the upper armature advances the upper armature axially toward the lower armature. The clutch also includes an anti-rotation guide, with a guide track that defines a guide path for a follower (e.g., a ball or tab) moveable along the guide track, for guiding relative movement between the upper armature and the anti-rotation guide. The guide track includes an axially-extending portion terminating in a circumferential loop. The axially-extending portion is used to advance the upper armature axially into engagement with the lower armature, whereupon the follower enters the circumferential loop on the guide track. Once the follower enters the circumferential loop the upper and lower armatures may be rotated together indefinitely to transfer torque and rotation. The same features, when rotated in the opposite direction, may cause the clutch to disengage.

Figure 1:
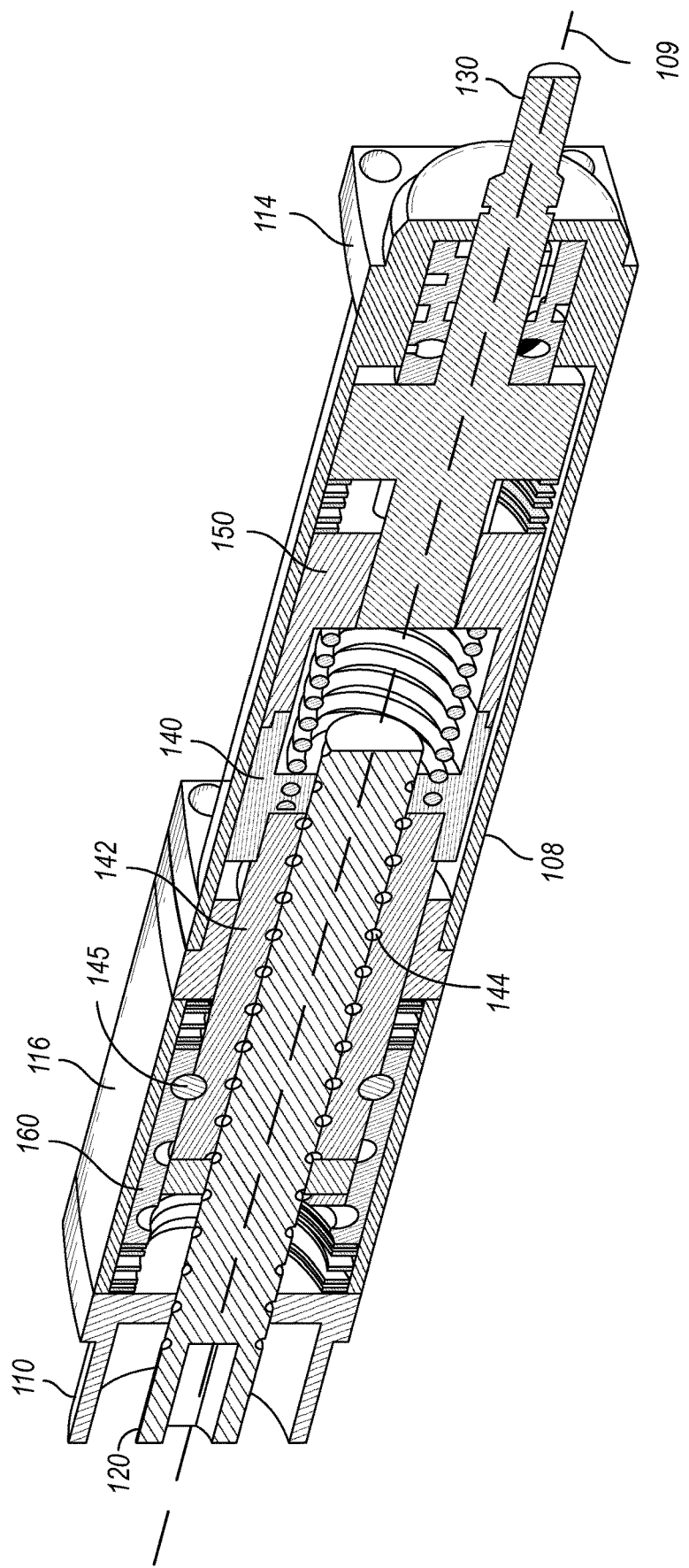
FIG. 1 is a perspective view of a clutch according to an example configuration.

FIG. 1 is a perspective view of a clutch 100 according to an example configuration. The clutch 100 includes a housing 108 for structural support and protection of various clutch components. The housing 108 may include any number of interconnected housing members to facilitate manufacturing and assembly, which in this example includes an upper housing 110, an intermediate housing 112, a lower housing 114, and an anti-rotation housing 116. An input shaft 120 is at an upper end of the clutch 100 and an output shaft 130 is at a lower end of the clutch 100. The input shaft 120 may be selectively rotationally coupled to the output shaft 130 to transfer torque and rotation therebetween. Typically, the clutch 100 would be oriented within a tool within a wellbore with the input shaft 120 above (uphole of) the output shaft 130, so that rotation to the input shaft 120 may be provided from above the clutch 100 for transfer of torque and rotation to a wellbore device (e.g., an SSSV) below the clutch. A central housing axis 109 is identified as part of reference geometry for discussing various orientations and movement.

In this example, the housing axis 109 aligns (is co-axial) with axes of rotation of various rotating members including the input shaft 120, the output shaft 130, the upper armature 140, and the lower armature 150 in this example. However, it is possible to construct other configurations with an angled housing, with offset and/or angled couplings between certain rotating members inside the housing 108, such as for applications where it is useful for the output shaft 130 to have a different angle than the input shaft, or for any other reason. Thus, the term "axial" or "axially" may be used according to its ordinary and customary meaning to describe a direction or progression along the housing 108 and in a directional component along a respective portion of the axis 109, whether or not the motion at any given point is truly parallel with the axis 109.

The upper and lower armatures 140, 150 may be selectively engaged to transfer torque through the clutch 100. Specifically, the input shaft 120 may be rotated to axially urge the upper armature 140 into engagement with a lower armature 150, and thereafter transfer torque from the input shaft 120 to the output shaft 130 via the engaged armatures 140, 150. The upper and lower armatures 140, 150 have cooperating engagement structures, further discussed below, such as a crown tooth profile (see FIGS. 4 and 5), friction plates, or other structures suitable to transfer torque from one rotating member to another. The upper armature 140 includes an elongate, tubular armature extension 142 that extends axially within the housing 108 with the input shaft 120 received therein. The upper armature 140 in this example is a two-piece upper armature, with the armature extension 142 separately formed and joined to the other portion of the upper armature 140 having the engagement structure, such as to facilitate manufacturing. Alternatively, the upper armature 140 including the armature extension 142 could be unitarily formed in another configuration such as by machining or additive manufacturing. Not shown, but included as needed are radial bearings to aid rotational movement and thrust bearings to aid rotational movement while supporting axially forces.

A drive 144 is provided to drive the upper armature 140 toward the lower armature in response to rotation of the input shaft 120. The input shaft 120 is rotatably coupled to the upper armature 140, with the drive 144 at an interface between the input shaft 120 and the upper armature 140 at the armature extension 142. The drive 144 may comprise a threaded member, ball screw mechanism, or other mechanism whereby relative rotation between the input shaft 120 and the upper armature 140 advances the upper armature 140 axially toward the lower armature 150. In the illustrated example, the drive 144 is a ball screw mechanism that has a helical pathway defined along an outer diameter (OD) of the input shaft 120 and an inner diameter (ID) of the armature extension 142 of the upper armature 140. One or more (typically, a plurality) of balls ride in the helical pathway of the drive 144, which can function in some respects as bearings that facilitate relative rotation between the input shaft 120 and the armature extension 142. The helical pathway leads to the upper armature 140 being axially advance in response to rotation of the input shaft 120 relative to the armature extension 142. Alternatively the drive 144 could incorporate a threaded connection between the input shaft 120 and the armature extension 142, with a similar helical pathway, although the ball screw mechanism may have benefits for this kind of application such as lower friction.

An aspect of this disclosure is an ability to guide the upper armature into engagement with the lower armature, such as to control how the upper armature 140 engages with the lower armature 150. In particular, the upper armature 140 may be advanced axially by relative rotation between the input shaft 120 and the armature extension 142. Simultaneously, movement of the armature extension 142 is guided by an anti-rotation guide 160, which movement may include both the axial advancement of the armature extension 142 and a rotational component as the armature extension 142 follows a helical guide path (described below) of the anti-rotation guide 160. Thus, the upper armature 140 may be guided to engage the lower armature 150 with no rotation or at least at a lower rotational speed than input shaft 120, and once engaged, the upper armature 140 and lower armature 150 may be rotated together at the full rotational speed of the input shaft 120.

In this example, the anti-rotation guide 160 is disposed around the armature extension 142 of the upper armature 140. The armature extension 142 is the equivalent of the ball nut of a ball screw assembly, or the nut of any screw assembly. The anti-rotation guide 160 guides movement of the upper armature 140 as it advances axially in response to rotation of the input shaft 120 towards the circumferential tract in the anti-rotation guide. The anti-rotation guide 160 also limits rotation of the upper armature 140 as the input shaft 120 is rotated inside it (hence the term anti-rotation), to ensure relative rotation between the input shaft 120 and the armature extension 142, to advance the armature 140. The anti-rotation guide 160 includes a guide track that defines the guide path for a follower 145 that is moveable along the guide track, for guiding relative movement between the upper armature 140 and the anti-rotation guide 160. The follower 145 is a ball in this example, but could comprise any suitable protruding feature of any suitable shape to follow the guide path. As the upper armature 140 advances axially by rotation of the input shaft 120, the anti-rotation guide 160 first guides the upper armature 140 axially toward the lower armature 150 to engage the upper and lower engagement structures, and thereafter allows the upper and lower armatures 140, 150 to be rotated together indefinitely by further rotation of the input shaft 120 to transfer torque and rotation from the input shaft 120 to the output shaft 130 via the engaged upper and lower armatures 140, 150. Various example configurations of the guide track are shown and discussed below in relation to FIGS. 6-9.

In this example configuration, the input shaft 120 is received inside the armature extension 142 and the anti-rotation guide 160 is disposed outside the armature extension 142 of the armature 140, although aspects of the disclosure apply to alternative configurations that use an input shaft to advance an armature and an anti-rotation guide to guide the advancing armature. For example, alternate embodiments may be constructed within the scope of this disclosure wherein the anti-rotation guide is instead disposed inside the armature extension and a hollow input shaft goes around the outside of the armature extension.

Figure 2:
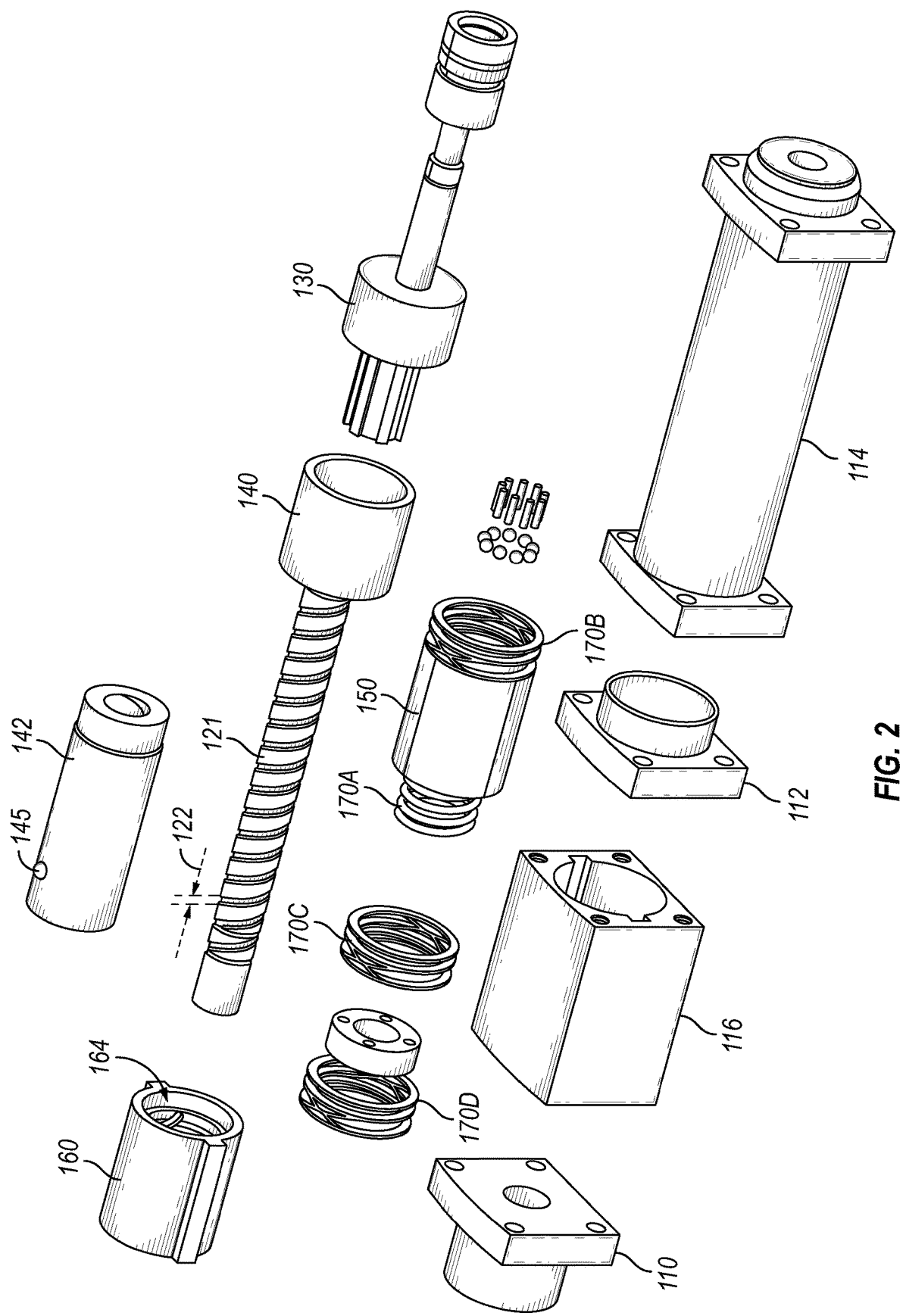
FIG. 2 is an exploded view of the clutch of FIG. 1 to further illustrate some of the various clutch components.

FIG. 2 is an exploded view of the clutch 100 of FIG. 1 to further illustrate some of the various clutch components. The components are re-arranged to fit the page. The illustrated components include the upper housing 110, intermediate housing 112, lower housing 114, anti-rotation housing 116, input shaft 120, output shaft 130, upper armature 140 and armature extension 142, lower armature 150, anti-rotation guide 160, and a plurality of biasing members 170 embodied as springs 170A, 170B, 170C, 170D. The drive between the input shaft 120 and armature extension 142 includes a helical pathway 121 defined on the OD of the input shaft 120, with a complementary helical pathway on the ID of the armature extension 142. The helical pathway 121 has a pitch 122 as an axial distance between consecutive helical loops. This helical pathway 121 between the input shaft 120 and the armature extension 142 to advance the upper armature 140 in response to rotation of the input shaft 120. Separately, a guide track defined on the inside of the anti-rotation guide 160 (which may also include a helical portion in some embodiments) is used to guide movement of the upper armature 140 as it is advanced. A follower 145, embodied in this example as a ball on the OD of the armature extension 142, travels along the guide track of the anti-rotation guide as further discussed below.

FIG. 3 is a cutaway view of the armature extension 142 juxtaposed with the anti-rotation guide 160 according to the example configuration of FIG. 1. The anti-rotation guide 160 includes an external rib 162 that can engage a complementary feature on the housing (e.g., a housing recess 118 depicted with broken reference lines) to constrain the anti-rotation guide within the housing to prevent relative rotation between the anti-rotation guide 160 and the housing. The axially-external rib 162 is axially extending in this example so that the anti-rotation guide 160 may be allowed to axially translate along the housing while rotation with respect to the housing is constrained. The anti-rotation guide 160 receives and guides movement of the armature extension 142.

A guide track in any given embodiment may be defined between the upper armature and the anti-rotation guide. Generally, a guide track may include any structure arranged along a desired guide track that is configured to be followed by a follower member (simply referred to herein as the follower). The guide track may be defined on the outside of the armature extension 142 and/or inside of the anti-rotation guide 160. In the example of FIG. 3, the guide track 164 specifically comprises a groove 167 defined along the inside, specifically, along an inner diameter (ID) 169 of the anti-rotation guide 160 that constrains movement of the follower 145, which is the ball in this case but can be another protruding feature such as tab. Alternate embodiments could also be constructed, for example, wherein the guide track comprises a raised portion, rather than a groove, defining the desired guide path for the follower to follow. The guide track 164 includes an axially-extending portion 166 terminating in a circumferential loop 168. The axially-extending portion 166 is axially-extending in the sense that it includes a component of movement along the axis 109. However, the axially-extending portion 166 is, more specifically, a helical portion terminating in the circumferential loop 168. As the armature extension 142 advances axially with respect to the anti-rotation guide 160, the follower 145 travels along the groove 167, first along the helical portion 166 and then into the circumferential loop 168. As the follower 145 travels along the helical portion 166, the armature extension 142 (and the entire upper armature) will advance axially and rotationally as constrained by the follower 145 in the helical portion 166. Once the follower 145 enters the circumferential loop 168, the armature extension 142 (and the entire armature) will cease advancing axially, and may be rotated indefinitely by continued rotation of the input shaft.

Reference is now made to FIGS. 4 and 5 together. FIG. 4 is a perspective view of the upper armature 140 according to the example configuration of FIG. 2. FIG. 5 is a perspective view of the lower armature 150 according to the example configuration of FIG. 2. An upper armature and lower armature generally define respective clutch faces 146, 156 that are designed to transfer torque from one to the other when axially engaged. The clutch faces 146, 156 in any given embodiment may include a crown tooth gear profile, a friction surface, or other cooperating members that when axially engaged will transfer torque, preferably with no appreciable rotational slippage between the clutch faces 146, 156. In this particular example, the clutch faces 146, 156 include respective crown tooth gear profiles as shown, which mesh when brought into axial engagement.

FIGS. 6-9 are schematic drawings (like flat patterns) of different examples of a guide track for guiding relative movement between the upper armature and the anti-rotation guide. In each of these examples, the guide track includes an axially-extending portion terminating in a circumferential loop. In each example, the guide track and follower will cooperate to guide movement of the armature. In each example, the axially-extending portion will advance the upper armature axially to allow the upper armature to engage the lower armature axially. The circumferential loop will then allow rotation of the upper armature indefinitely (by further rotation of the input shaft) to transfer torque from the upper armature to the lower armature without further axial movement. However, in each example, the axially-extending portion has a different shape that will cause a corresponding dynamic response of the upper armature. In any given embodiment, there can be one or more such guide tracks. There can also be more than one ball, tab, or other follower. It is possible for a single ball to follow any number of guide tracks. If there are two or more balls, the angle between guide tracks must equal the angle between balls. For example, if there are three guide tracks (each 120 deg from the other) and there are two balls, the two balls must be 120 degrees from each other; if there are four guide tracks at 90 deg and two balls, the two balls must be at 90 deg or 180 deg; and so on for an almost infinite number of combinations. To summarize; if there are two or more balls, the angle between the balls must be such that they can simultaneously exit and enter the guide tracks. At a junction of the axially-extending portion of the guide track and the circumferential loop there can be a moveable (e.g., hinged or flexible) gate such that rotation in one direction allows the ball or other follower to freely pass and rotation in the other direction directs the ball or other follower into the guide tracks, as discussed in the specific examples of FIGS. 6-9 below.

Figure 6:
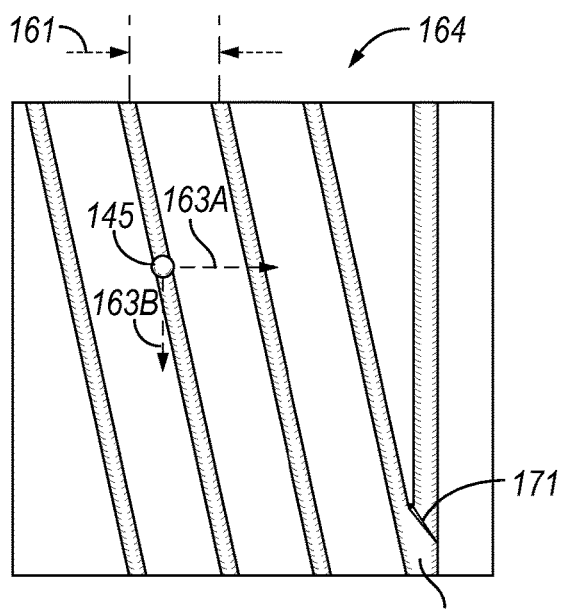
FIG. 6 is a schematic representation of the guide track of FIG. 3, wherein the axially-extending portion is a helical portion.

FIG. 6 is a schematic representation of the guide track 164 of FIG. 3, wherein the axially-extending portion is a helical portion 166. As the follower 145 travels along the helical portion 166, its motion will include an axial component diagrammed as 163A and a rotational component diagrammed as 163B. Because the axially-extending portion 166 includes an axial component 163A, the upper armature will be advanced axially toward the lower armature until the follower 145 enters the circumferential loop 168. The rotational component 163B will simultaneously cause the upper armature to rotate as it advances axially. However, a pitch 161 of the helical portion 166 is larger than the pitch of the thread on the input shaft (See FIG. 2), so the upper armature will have a lower rotation rate than the input shaft. This difference will provide the anti-rotation aspect discussed above, and the relatively slow rotation of upper armature may limit the risk of damage to the clutch faces as the upper and lower armatures engage. An optional gate 171 is provided at a junction between the axially-extending, helical portion 166 and the circumferential loop 168 such that rotation in one direction allows the ball or other follower to freely pass and rotation in the other direction directs the ball back into the helical portion 166 of the guide track 164.

Figure 7:
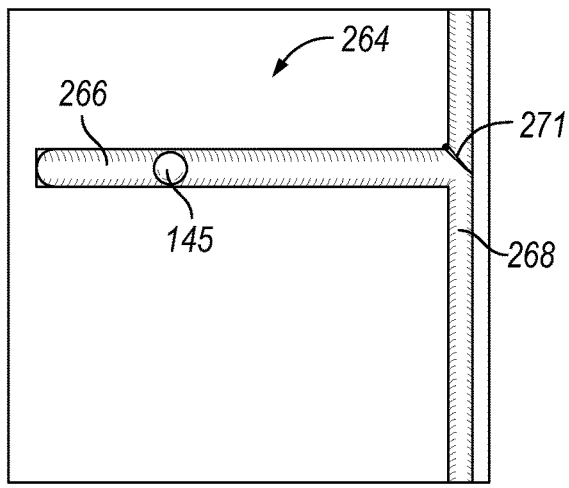
FIG. 7 is a schematic representation of an alternate guide track wherein the axially-extending portion is a straight section aligned with an axis of rotation.

FIG. 7 is a schematic representation of an alternate guide track 264 wherein the axially-extending portion 266, rather than being helical, is a straight section aligned with an axis of rotation. This will provide pure axial translation of the upper armature, as compared with the relative rotation provided by the helical portion of FIG. 6. As the follower 145 moves from the axially-extending portion into the circumferential loop 268, movement of the upper armature may shift from pure axial translation to pure rotation. Again, the axial translation is to bring the upper armature into engagement with the lower armature, and the subsequent rotation is to allow transfer of torque and rotation from the engaged upper and lower armatures. An optional gate 271 is provided at a junction between the axially-extending portion 166 and the circumferential loop 268 such that rotation in one direction allows the ball or other follower to freely pass and rotation in the other direction directs the ball back into the axially-extending portion 166 of the guide track 264

Figure 8:
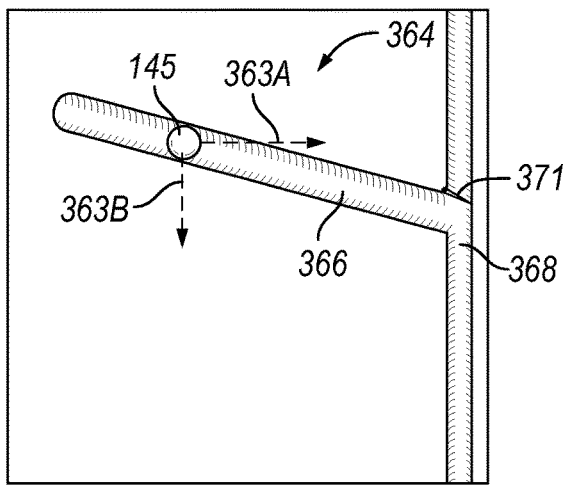
FIG. 8 is a schematic representation of an alternate guide track wherein the axially-extending portion comprises a straight angled portion.

FIG. 8 is a schematic representation of an alternate guide track 364 wherein the axially-extending portion comprises a straight angled portion 366. As with FIG. 6, as the follower 145 travels along the guide track 364, its motion will include an axial component diagrammed as 363A and a rotational component diagrammed as 363B. When this guide track is incorporated into a circular ID of the anti-rotation guide, it will be helical, like FIG. 6 but at a much smaller helix angle than FIG. 6, so the rate of rotation per unit length of axial advancement will be less than in FIG. 6. An optional gate 371 is provided at a junction between the axially-extending, straight angled portion 366 and the circumferential loop 368 such that rotation in one direction allows the ball or other follower to freely pass and rotation in the other direction directs the ball back into the straight angled portion 366 of the guide track 364.

Figure 9:
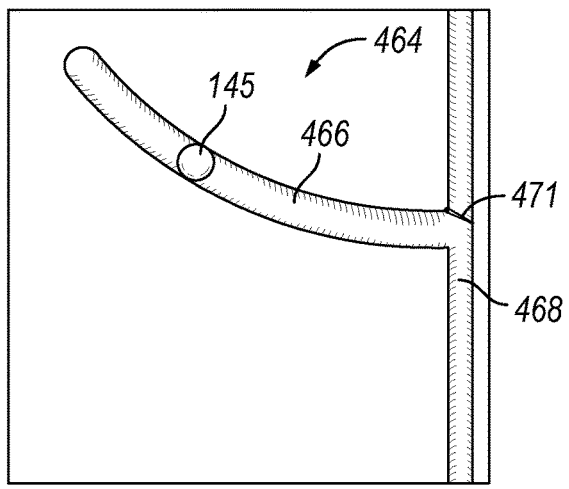
FIG. 9 is a schematic representation of another example guide track wherein the axially extending portion is curved.

FIG. 9 is a schematic representation of another example guide track 464 wherein the axially extending portion 466 is curved, as compared with the linear axially extending portions of the prior FIGS. 6-8. A possible benefit of this guide track 464 is that the rotation rate of the upper armature may decelerate as the follower 145 progresses toward the circumferential loop 468 and as the upper armature nears the lower armature to lessen a risk of damage to the armatures upon engagement. Moreover, this example along with the foregoing examples demonstrate that a large variety of pathways may be constructed according to this disclosure to guide the upper armature axially and then rotationally. An optional gate 471 is provided at a junction between the axially-extending portion 466 and the circumferential loop 468 such that rotation in one direction allows the ball or other follower to freely pass and rotation in the other direction directs the ball back into the curved axially-extending portion 466 of the guide track 464. The gate 471 (or any of the foregoing gates) can be spring loaded so that it always returns to the open position after follower 145 passes.

Figure 10:
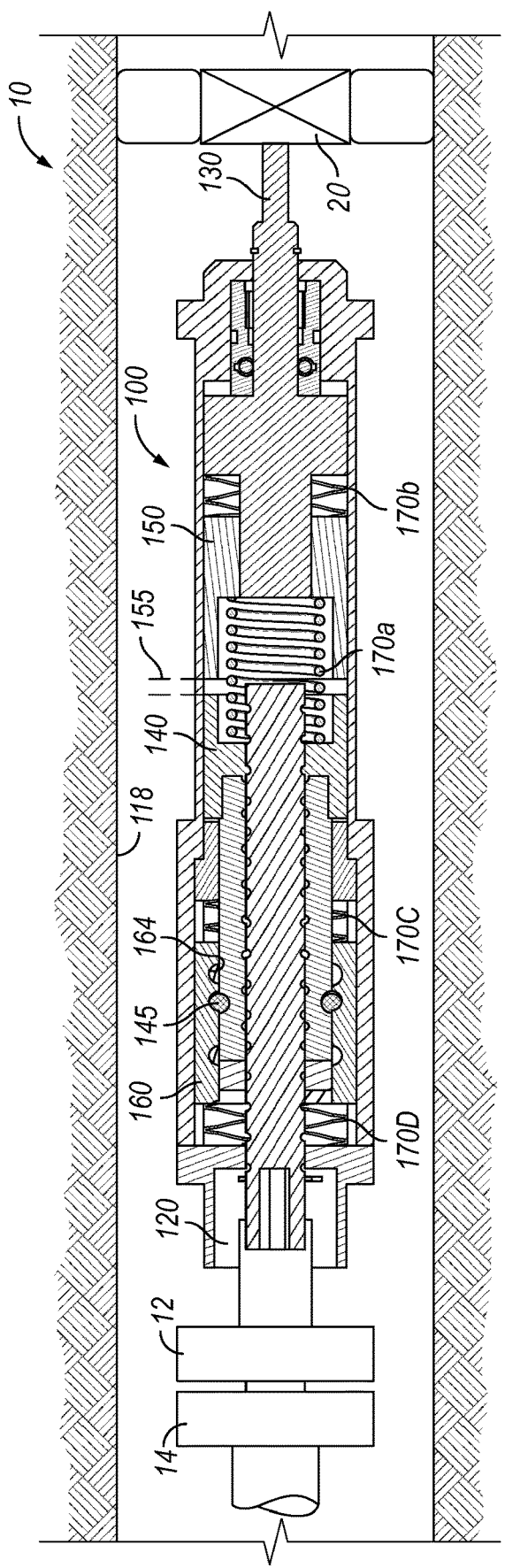
FIG. 10 is a sectional, side view of a well flow control system incorporating the clutch of FIG. 1, with the upper and lower armatures disengaged.

FIG. 10 is a sectional, side view of an actuation system 10, which may comprise a linear actuator, incorporating the clutch 100 of FIG. 1, with the upper and lower armatures 140, 150 disengaged. A gap 155 is present between the upper and lower armatures 140, 150. The system 10 may be installed as part of a tool in a well 18 for controlling the production of hydrocarbons such as oil and gas. The system 10 and the portion of the well 18 in the figure are shown horizontally, such as at a horizontal section of the well 18; thus an uphole direction in the reference frame of FIG. 10 is to the left and a downhole direction is to the right. the clutch 100 as a part of system 10 may be installed in a subsurface safety valve (SSSV) as part of a well completions to control the flow of produced hydrocarbon fluids. The system 10 includes a motor 12 and a brake 14 coupled to the input shaft 120 uphole of the clutch 100. The motor 12 is used to drive rotation of the input shaft 120 when it is desired to operate the clutch 100. The brake 14 is directly or indirectly coupled to the input shaft 120 and is used to selectively modulate or prevent rotation of the input shaft 120. The SSSV 20 may be opened or closed by rotation of the output shaft 130, such as via a ball screw assembly.

To operate the SSSV 20, the motor 12 may be powered on by a signal and a power source from the surface; the power source can also be or include a power source component (e.g., another battery) within or near the SSSV if the power source is a battery. The motor 12 powers rotation of the input shaft 120 relative to the upper armature 140 (the armature extension 142 in this case). The upper armature 140 advances axially toward the lower armature 150 in response to the rotation of the input shaft 120. As the upper armatures 140 advances, the follower 145 initially travels along the helical portion of the guide track 164, and the anti-rotation guide 160 limits rotation of the upper armature 140 so that the input shaft 120 rotates inside it while also guiding the upper armature 140 axially toward the lower armature 150, as discussed above. The various springs 170A-170D also begin to compress.

Figure 11:
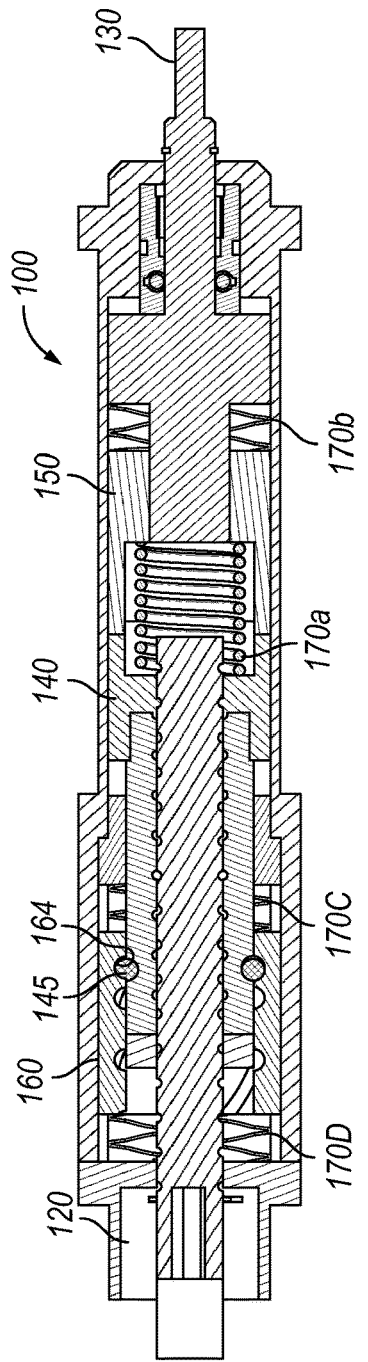
FIG. 11 is a sectional, side view of the clutch fully engaged.

FIG. 11 is a sectional, side view of the clutch 100 fully engaged (other components of the system 10 of FIG. 10 are removed for clarity). The upper armature 140 is now in axial engagement with the lower armature 150, the gap 155 has closed, and the follower 145 has entered the circumferential loop of the guide track 164 on the right (downhole) end of the anti-rotation guide 160. Thus, with continued rotations of the input shaft 120, the follower 145 will travel in the circumferential loop of the guide track 164, and torque and rotation may be transferred through the clutch 100 from the input shaft 120 to the output shaft 130. The motor 12 may continue to provide rotation to the input shaft 120 for so long as rotation of the output shaft 130 is needed, such as until the SSSV is opened, or in other uses of the clutch 100, until some other downhole device coupled to the output shaft 130 has been activated.

The various springs 170A-170D are compressed as the upper armature 140 is driven toward and into engagement with the lower armature 150 from the position of FIG. 10 to the position of FIG. 11. The first spring 170A biases the upper and lower armatures 140, 150 axially apart. The second spring 170B biases lower armature 150 towards the upper armature when the upper and lower armature are engaged to mitigate backlash when the upper and lower armatures 140, 150 are engaged and the motor is turned off. The third spring 170C biases the follower (ball) 145 to remain in the circumferential groove of the guide track 164.

The fourth spring 170D biases the anti-rotation guide 160 to move the follower (ball) 145 from the circumferential loop on the right end of the anti-rotation guide 160 back into the helical portion to the left of the circumferential loop when the clutch 100 is subsequently disengaged. The upper armature 140 may be disengaged from the lower armature 150 by reversing the rotational direction of the input shaft 120 to advance the upper armature 140 axially away from the lower armature 150. The input shaft 120 can be reversed by reversing the rotation direction of the motor or by disengaging the brake, at which time spring 170A will cause the upper armature to want to disengage from the lower armature by rotating in the opposite direction from the engagement rotation direction. The anti-rotation guide 160 then guides the upper armature 140 from the circumferential loop back into the axially-extending portion of the guide track.

The input shaft is rotatably disposed within the upper armature with a drive therebetween. Relative rotation between the input shaft and the upper armature advances the upper armature axially away from the lower armature. In at least some examples, the drive has a helical pathway, such as a helical threaded portion or a helical ball screw pathway that advances the upper armature axially in response to rotation of the input shaft. However, the disclosure is deemed to cover any drive mechanism that converts relative rotation to axial movement of the upper armature, even if a true helical path.

Accordingly, the teachings of this disclosure encompass any of a variety of systems, apparatus, and methods that facilitate torque transfer downhole, including but not limited to a downhole clutch, and systems incorporating such a clutch to operate a downhole device, including but not limited to a downhole valve. Various embodiments may include any of the various features disclosed herein, including one or more of the following statements.

Statement 1. A clutch for downhole torque transfer, comprising: an upper armature; a lower armature; an input shaft rotatably coupled to the upper armature with a drive mechanism, whereby relative rotation between the input shaft and the upper armature advances the upper armature axially toward the lower armature; and an anti-rotation guide including a guide track and a follower moveable along the guide track for guiding relative movement between the upper armature and the lower armature, the guide track including an axially-extending portion terminating in a circumferential loop, wherein the axially extending portion guides the upper armature into axial engagement with the lower armature in response to rotation of the input shaft and the circumferential loop thereafter allows rotation of the upper and lower armatures together in response to further rotation of the input shaft.

Statement 2. The clutch of statement 1, wherein the axially-extending portion of the guide track comprises a helical portion terminating in the circumferential loop of the guide track, whereby the upper armature rotates relative to the lower armature while advancing axially toward the lower armature when following the helical portion.

Statement 3. The clutch of statement 2, wherein a pitch of the helical portion of the guide track is greater than a pitch of the drive mechanism such that the upper armature rotates at a lower rotation rate than the input shaft when the follower is in the helical portion.

Statement 4. The clutch of statement 2 or 3, further comprising a gate located at a junction of the helical portion of the guide track and the circumferential loop.

Statement 5. The clutch of statement 1 to 4, wherein the guide track comprises a groove defined on an inside of the anti-rotation guide and wherein the follower comprises a ball secured on an outside of the upper armature that travels along the groove.

Statement 6. The clutch of statement 1 to 5, wherein the drive mechanism between the input shaft and the upper armature comprises a ball screw.

Statement 7. The clutch of statement 1 to 6, further comprising one or more spring from the group consisting of: a first spring that biases the upper and lower armature axially apart, a second spring that biases the lower armature towards the upper armature when the two armatures are engaged, a third spring that biases the follower to remain in the circumferential loop, and a fourth spring that biases the anti-rotation guide to move the follower from the circumferential loop back into the helical portion.

Statement 8. An actuation system for a tool, comprising: an input shaft; a motor coupled to the input shaft for driving rotation of the input shaft; an upper armature having an upper engagement structure; a drive mechanism for advancing the upper armature axially in response to rotation between the input shaft and the upper armature; an anti-rotation guide, with a guide track and a follower moveable along the guide track for guiding relative movement between the upper armature and the anti-rotation guide, the guide track including an axially-extending portion terminating in a circumferential loop; a lower armature having a lower engagement structure axially engageable by the upper engagement structure to transfer torque from the upper armature to the lower armature while engaged; and an output shaft coupled to the lower armature.

Statement 9. The actuation system of statement 8, further comprising: a downhole device coupled to the output shaft, wherein rotation of the output shaft operates the downhole device.

Statement 10. The flow control system of statement 9, wherein the downhole device comprises a subsurface safety valve (SSSV) and rotation of the output shaft closes or opens the SSSV.

Statement 11. The actuation system of statement 8 or 9, further comprising a brake engageable with the input shaft to resist rotation of the input shaft when the motor is off.

Statement 12. The actuation system of statement 8 to 10, wherein the input shaft is rotatably disposed within an armature extension of the armature and the anti-rotation guide is disposed around the armature extension.

Statement 13. The actuation system of statement 12, wherein the axially-extending portion of the guide track comprises a helical portion terminating in the circumferential loop, whereby the upper armature rotates relative to the anti-rotation guide and advances axially while following the helical portion.

Statement 14. The actuation system of statement 13, wherein the guide track comprises a groove defined on an inside of the anti-rotation guide and wherein the follower is secured on an outside of the upper armature to follow the groove defined on the inside of the anti-rotation guide.

Statement 15. A method of transferring torque downhole, comprising: powering rotation of an input shaft relative to an upper armature with an upper engagement structure; advancing the upper armature axially toward a lower armature with a lower engagement structure in response to the rotation of the input shaft; as the upper armatures advances, guiding the upper armature axially along an axially-extending portion of a guide track to engage the upper engagement structure with the lower engagement structure and then along a circumferential loop of the guide track to transfer torque from the upper armature to the lower armature via the engagement upper and lower engagement structures; and driving rotation of an output shaft with the lower armature.

Statement 16. The method of statement 15, wherein the axially extending portion and the circumferential loop are defined on an anti-rotation guide disposed about the upper armature, wherein guiding the upper armature comprises moving a follower on an outside of the upper armature along the axially extending portion and into the circumferential loop.

Statement 17. The method of statement 15 or 16, wherein the axially extending portion comprises a helical portion with an axial component and a rotational component, wherein guiding the upper armature axially results from the axial component of the helical portion.

Statement 18. The method of statement 17, wherein the step of advancing the upper armature axially toward the lower armature is performed with a helical drive between the input shaft and the upper armature, wherein the helical drive has a different pitch than the helical portion of the guide track.

Statement 19. The method of statement 15 to 18, further comprising: using the rotation of the output shaft to operate a subsurface safety valve (SSSV).

Statement 20. The method of statement 15 to 19, further comprising: reversing the rotation of the input shaft to advancing the upper armature axially away from the lower armature; and guiding the upper armature from the circumferential loop back into the axially-extending portion.

To facilitate a better understanding of the present invention, the following examples of certain aspects of some embodiments are given. In no way should the following examples be read to limit, or define, the entire scope of the disclosure.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A clutch for downhole torque transfer, comprising:
an upper armature;
a lower armature;
an input shaft rotatably coupled to the upper armature with a drive mechanism, whereby relative rotation between the input shaft and the upper armature advances the upper armature axially toward the lower armature; and
an anti-rotation guide including a guide track and a follower moveable along the guide track for guiding relative movement between the upper armature and the lower armature, the guide track including an axially-extending portion terminating in a circumferential loop, wherein the axially extending portion guides the upper armature into axial engagement with the lower armature in response to rotation of the input shaft and the circumferential loop thereafter allows rotation of the upper and lower armatures together in response to further rotation of the input shaft.

2. The clutch of claim 1, wherein the axially-extending portion of the guide track comprises a helical portion terminating in the circumferential loop of the guide track, whereby the upper armature rotates relative to the lower armature while advancing axially toward the lower armature when following the helical portion.

3. The clutch of claim 2, wherein a pitch of the helical portion of the guide track is greater than a pitch of the drive mechanism such that the upper armature rotates at a lower rotation rate than the input shaft when the follower is in the helical portion.

4. The clutch of claim 2, further comprising a gate located at a junction of the helical portion of the guide track and the circumferential loop.

5. The clutch of claim 1, wherein the guide track comprises a groove defined on an inside of the anti-rotation guide and wherein the follower comprises a ball secured on an outside of the upper armature that travels along the groove.

6. The clutch of claim 1, wherein the drive mechanism between the input shaft and the upper armature comprises a ball screw.

7. The clutch of claim 1, further comprising one or more spring from the group consisting of:
a first spring that biases the upper and lower armature axially apart,
a second spring that biases the lower armature towards the upper armature when the two armatures are engaged,
a third spring that biases the follower to remain in the circumferential loop, and
a fourth spring that biases the anti-rotation guide to move the follower from the circumferential loop back into the helical portion.

8. An actuation system for a tool, comprising:
an input shaft;
a motor coupled to the input shaft for driving rotation of the input shaft;
an upper armature having an upper engagement structure;
a drive mechanism for advancing the upper armature axially in response to rotation between the input shaft and the upper armature;
an anti-rotation guide, with a guide track and a follower moveable along the guide track for guiding relative movement between the upper armature and the anti-rotation guide, the guide track including an axially-extending portion terminating in a circumferential loop;
a lower armature having a lower engagement structure axially engageable by the upper engagement structure to transfer torque from the upper armature to the lower armature while engaged; and
an output shaft coupled to the lower armature.

9. The actuation system of claim 8, further comprising:
a downhole device coupled to the output shaft, wherein rotation of the output shaft operates the downhole device.

10. The actuation system of claim 9, wherein the downhole device comprises a subsurface safety valve (SSSV) and rotation of the output shaft closes or opens the SSSV.

11. The actuation system of claim 8, further comprising a brake engageable with the input shaft to resist rotation of the input shaft when the motor is off.

12. The actuation system of claim 8, wherein the input shaft is rotatably disposed within an armature extension of the upper armature and the anti-rotation guide is disposed around the armature extension.

13. The actuation system of claim 12, wherein the axially-extending portion of the guide track comprises a helical portion terminating in the circumferential loop, whereby the upper armature rotates relative to the anti-rotation guide and advances axially while following the helical portion.

14. The actuation system of claim 13, wherein the guide track comprises a groove defined on an inside of the anti-rotation guide and wherein the follower is secured on an outside of the upper armature to follow the groove defined on the inside of the anti-rotation guide.

15. A method of transferring torque downhole, comprising:
powering rotation of an input shaft relative to an upper armature with an upper engagement structure;
advancing the upper armature axially toward a lower armature with a lower engagement structure in response to the rotation of the input shaft;
as the upper armature advances, guiding the upper armature axially along an axially-extending portion of a guide track to engage the upper engagement structure with the lower engagement structure and then along a circumferential loop of the guide track to transfer torque from the upper armature to the lower armature via the upper and lower engagement structures; and
driving rotation of an output shaft with the lower armature.

16. The method of claim 15, wherein the axially extending portion and the circumferential loop are defined on an anti-rotation guide disposed about the upper armature, wherein guiding the upper armature comprises moving a follower on an outside of the upper armature along the axially extending portion and into the circumferential loop.

17. The method of claim 15, wherein the axially extending portion comprises a helical portion with an axial component and a rotational component, wherein guiding the upper armature axially results from the axial component of the helical portion.

18. The method of claim 17, wherein the step of advancing the upper armature axially toward the lower armature is performed with a helical drive between the input shaft and the upper armature, wherein the helical drive has a different pitch than the helical portion of the guide track.

19. The method of claim 15, further comprising:
using the rotation of the output shaft to operate a subsurface safety valve (SSSV).

20. The method of claim 15, further comprising:
reversing the rotation of the input shaft to advancing the upper armature axially away from the lower armature; and
guiding the upper armature from the circumferential loop back into the axially-extending portion.

* * * * *